Feb. 25, 1936. A. J. MACY 2,032,139
COLOR SCREEN DEVICE
Filed May 26, 1934
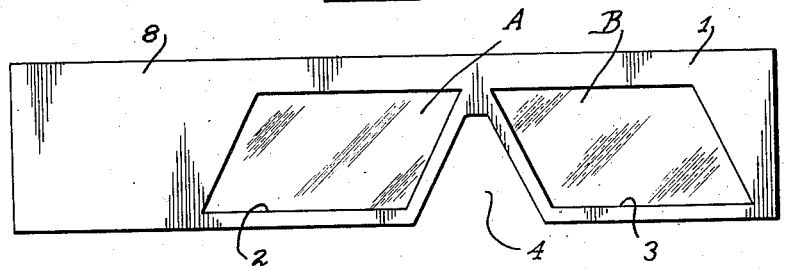
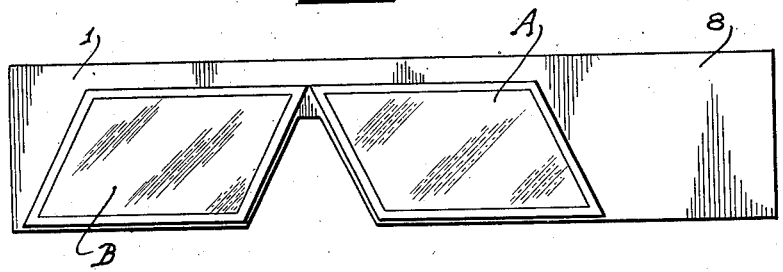
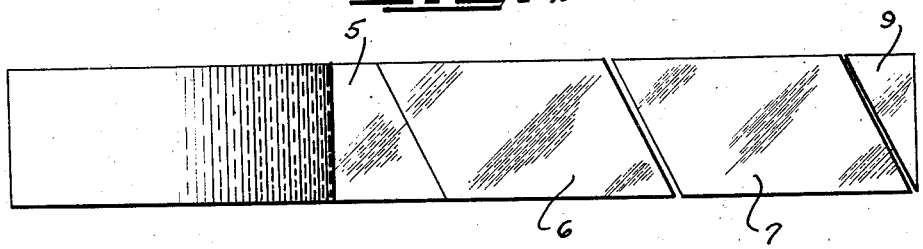

Patented Feb. 25, 1936

2,032,139

UNITED STATES PATENT OFFICE 2,032,139

COLOR SCREEN DEVICE

Alfred J. Macy, Evanston, Ill., assignor to Macy Art Process Corporation, Chicago, Ill., a corporation of Illinois Application May 26, 1934, Serial No. 727,637

2 Claims. (Cl. 88—29)

The present invention relates to color screen device, and will be explained herein as bi-colored spectacles.

The present invention finds ready use in connection with two color stereoscopic pictures or stereograms, so called, and more particularly with advertising matter employing two color pictures wherein complementary views of the pictures are superimposed or impressed on the same surface, and when viewed through color sections different in color, from one another, but corresponding in color to the impressions of the complementary views, affords the observer a clear distinct impression of the picture and with the certain views thereof outstanding out of the plane of the sheet on which the picture is printed.

Within recent years many millions of dollars have been expended for advertising matter and recently pictures have been employed for illustrating intricate parts of machinery and other articles of commerce, as well as processes of different kinds, in their various stages, and serve as ideal means for making permanent records of such articles or processes, from an artistic as well as from the commercial viewpoint, with all of the interesting features of reality of the thing itself.

In connection with such pictures, a remarkable illusion is produced whereby the observer is given the same impression of solidity and perspective as actually obtains in the scene itself. Heretofore bi-colored spectacles, have been employed, wherein the eye pieces or eye portions were made of bi-colored pieces of gelatin.

It has been found, that in manufacturing such bi-colored spectacles with gelatin, great care must be exercised in the manufacture of such spectacles, as gelatin is very susceptible to humidity and temperature changes so that such material must be worked under such conditions of humidity and temperature as will not cause the gelatin to become limp or to become so brittle, as to be unsatisfactory in the completed spectacles.

Furthermore another disadvantage observed in the use of gelatine has been that the gelatin sheets have been of varying thicknesses thereby causing varying color intensity. Furthermore the gelatin is supplied in sheets thus resulting in large and costly waste to cut the gelatine pieces required for spectacles of the type herein involved.

Another disadvantage present in the use of gelatin is that the surface thereof is velvety thus impeding proper diffusion of light through the eye pieces of the spectacles. Also the gelatine surfaces are easily scratched, thus making the same unsatisfactory for use and also any moisture falling on the lenses impairs the same if not forms holes in such eye pieces to the detriment of the bi-colored spectacles.

The present invention is concerned with bi-colored spectacles, or color screen device, wherein the eye pieces, each of a color different from the other, are made from material which is cheaper, which is more uniform in thickness, more nearly optically parallel, and less affected by temperature and humidity changes and which enjoys constant color value.

The materials utilized for the eye pieces of the present invention, may be readily fabricated by automatic machinery, without regard to the humidity and temperature conditions in the neighborhood of the machine and as it is not soluble in water at ordinary temperatures and pressures, it is not so liable to damage or destruction in use.

An object of the present invention is to provide a color screen device with eye pieces which are less subject to humidity and temperature changes than gelatine.

Another object of the present invention is to provide a color screen device, such as bi-colored spectacles, wherein the eye piece material is supplied in strip form, and cut to length and applied to the spectacle frame, automatically and at low manufacturing costs.

A further object of the invention is to provide a color screen device, such as bi-colored spectacles, with eye pieces or window openings of such shape, and in such relative position, as to render the field of vision larger than is possible with the present type of color screen device. This is especially useful by people who have to wear glasses for the correction of vision.

A still further object of the present invention is to improve color screen devices, or bi-colored spectacles, whereby the same may be more economically manufactured, and whereby the same may be more satisfactory in use and of greater longevity.

Generally speaking, the present invention contemplates the provision of rhombic openings in a spectacle frame which openings are covered by pieces of transparent colored material, with one color in one opening and a different color in the other opening, which material is less subject to humidity and temperature changes than gelatin and in this regard regenerated cellulose is preferably employed.

The invention also contemplates, and has for an object, provision of a novel method of manufacturing color screen devices.

The above other and further objects of the invention will be apparent from the following description, accompanying drawing, and appended claims.

The accompanying drawing illustrates bi-colored spectacles constructed in accordance with the principles of the present invention, and the views thereof are as follows:

Figure 1 is a front elevational view,

Figure 2 is a rear elevational view,

Figure 3 is an end view of the spectacles illustrated in Figures 1 and 2, and

Figure 4 is a portion of a strip of material employed for making the eye pieces of the devices of the present invention.

The form of the invention as herein illustrated, includes a frame 1, which may be made of inexpensive material such as cardboard, and which is stamped or punched to provide eye or sight openings 2 and 3, and also a notch 4 to bridge the nose of a user. The openings 2 and 3 are formed as rhomboids and arranged with the upper acute angles in juxtaposition.

Figure 4 illustrates a strip 5 of suitable transparent material, such as regenerated cellulose, or like product, which is supplied in strip form of proper width and which may be run through an automatic machine for cutting into eye pieces 6 and 7, of rhombic form.

It is to be understood that the eye pieces for the right eye are of different color than the eye pieces for the left eye, with the eye piece for the right eye as blue, for instance, and the eye piece for the left eye, as red, for instance.

The material of which the frame 1 is made may be also supplied in strip form and this together with the strip 5 of transparent material, may be fed to an automatic machine which blanks or stamps out the frame, as illustrated in Figures 1 and 2, and at the same time cuts out the eye pieces 6 and 7 and later applies these eye pieces to the frame.

The eye pieces, designated generally as A and B in Figures 1 and 2 are shown as pasted or glued to the rear exposed surface of the frame 1 along the margins of the openings 2 and 3. If, however some other form of attachment is desired such eye pieces lend themselves readily to such other form.

The openings 2 and 3, and the notch 4, are preferably placed off center of the length of the frame member 1, to provide at one end, a portion 8 which serves as a handle for utilizing the device in holding it before the eyes of the observer.

The manner of cutting the strips 5 into rhombic eye pieces 6 and 7 utilizes practically all of the strip, the resulting waste being small triangular pieces 9, one at each end of the strip. Figure 4 illustrates the strip as being wound in a roll with a portion of the free end thereof extended and the pieces 6 and 7 appearing with the piece 7 as severed with the piece 6 severed from the strip but not bodily displaced in the same manner as piece 7.

It will be observed that the present invention provides a color screen device wherein the window spaces or eye openings are of such shape and position as to increase the range of vision to maximum. The formation of the windows or openings in the frame, as being rhombic in form, in addition to providing windows of increased size, enables cutting of the pieces 6 and 7 from strip material and with a minimum waste, thus reducing the manufacturing cost of the article to a considerable extent.

Pasting of the eye pieces to one exposed surface of the frame is instrumental in maintaining the cost of manufacture at minimum, which is necessary, as these spectacles are given away as advertising novelties.

The present invention lends itself very readily to production manufacture on a quantity basis in automatic machinery and under such working conditions as to eliminate the usual care exercised as to humidity and temperature where the eye pieces are made of gelatine.

The use of a regenerated cellulose or a non-hygroscopic and transparent cellulose derivative such as the transparent and non-hygroscopic material now commonly known by the trade name of "Cellophane" as the material for the eye pieces, affords a cheaper article, one which is stronger, and which may be made economically cheaper than the gelatine type and wherein the eye pieces are more uniform in thickness and wherein the eye pieces are more nearly optically parallel thus increasing the clarity of the picture observed through the screen.

The aforementioned transparent and non-hygroscopic material provides color screen devices which are not so apt to be damaged or destroyed as the material does not become cloudy, is not easily scratched, and is, at ordinary temperatures, not affected by moisture.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

1. Bi-colored spectacles comprising a frame fashioned from a single piece of material such as cardboard fashioned to provide two rhombic eye-openings and a V-shaped recess between said openings to fit over the nose of a user, said recess having straight margins disposed parallel to the respective juxtaposed margins of said openings to afford minimum opaque areas between said recess and each of said openings, rhombic eye-pieces formed from a transparent and non-hygroscopic cellulose derivative material overlying said openings and being pasted to the same side of said frame member about said openings, said pieces of material being of different colors.

2. Bi-colored spectacles comprising a spectacle frame of cardboard or like material having a nose notch cut in it from one margin thereof, said notch being V-shaped with straight line margins so as to fit any size or shape of nose, said frame having two rhombic eye-openings in it with the opening margins adjacent said notch being parallel to the respective juxtaposed notch margins to assure full vision through said openings irrespective of the height of said frame on a nose, and rhombic eye-pieces of non-hygroscopic transparent material overlying said openings and pasted to the same side of said frame about said openings, said eye-pieces being of different colors.

ALFRED J. MACY.